(12) United States Patent
Joshua et al.

(10) Patent No.: US 9,298,627 B2
(45) Date of Patent: Mar. 29, 2016

(54) SHARED OP-SYMMETRIC UPDATE-SENSITIVE VARIABLES

(71) Applicant: Marvell World Trade Ltd., St. Michael (BB)

(72) Inventors: Eitan Joshua, Ramot Menashe (IL); Noam Mizrahi, Modiin (IL)

(73) Assignee: Marvell World Trade Ltd., St. Michael (BB)

( * ) Notice: Subject to any disclaimer, the term of this patent is extended or adjusted under 35 U.S.C. 154(b) by 80 days.

(21) Appl. No.: 14/153,526

(22) Filed: Jan. 13, 2014

(65) Prior Publication Data

US 2014/0201469 A1     Jul. 17, 2014

Related U.S. Application Data

(60) Provisional application No. 61/752,271, filed on Jan. 14, 2013.

(51) Int. Cl.
*G06F 12/08* (2006.01)

(52) U.S. Cl.
CPC ........ *G06F 12/0831* (2013.01); *G06F 12/0804* (2013.01)

(58) Field of Classification Search
None
See application file for complete search history.

(56) References Cited

U.S. PATENT DOCUMENTS

| | | | |
|---|---|---|---|
| 6,038,644 A * | 3/2000 | Irie et al. | 711/141 |
| 6,446,165 B1 * | 9/2002 | Arimilli et al. | 711/120 |
| 8,140,771 B2 * | 3/2012 | Arimilli et al. | 711/141 |
| 2003/0009643 A1 * | 1/2003 | Arimilli et al. | 711/155 |
| 2014/0201470 A1 | 7/2014 | Joshua et al. | |

* cited by examiner

*Primary Examiner* — Gary Portka

(57) ABSTRACT

Embodiments include multi-processor systems, including multi-core processor systems, as well as methods for operating the same, in which at least one processor or processor core is configured to receive an instruction directing the at least one processor core to read a value associated with a memory address. In response to receiving the instruction and before execution of the instruction, the at least one processor or processor core causes ones of the plurality of mutually communicatively inter-coupled processor cores to provide a plurality of locally stored values that are stored individually in the respective processor cores and that are associated with the memory address.

20 Claims, 7 Drawing Sheets

SHARED OP-SYMMETRIC UPDATE-SENSITIVE VARIABLES

CROSS REFERENCE TO RELATED APPLICATIONS

The present disclosure claims priority to U.S. Provisional Patent Application No. 61/752,271, filed Jan. 14, 2013, which is incorporated herein by reference in its entirety.

TECHNICAL FIELD

Embodiments of the present invention relate to shared memory addresses in a multi-processor system, and in particular to handling shared op-symmetric update-sensitive variables.

BACKGROUND

In a multi-processor system, or multi-core processor system, some variables are shared by all cores of the processor or by all processors within the system. Conventionally, updates to shared variables go through a globally unique serialization point. For example, hardware cache coherency and a semaphore system are often needed to maintain consistency of a shared variable during a read-modify-write operation. For certain types of variables, such as those that are updated often but read infrequently, multiple processors contend with one another to update the variable in the shared memory. And memory contentions result in reduced performance either because of retries or blocking conditions. For example, where a shared counter is read by a first processor, access to the shared counter by a second processor is blocked. The second processor waits for the shared memory to become available before completing its update operation. In another example, such as may occur in a reduced instruction set computing (RISC) architecture, software reads a variable and then attempts to write to the same variable. But if another access to the variable occurs after the first read, the hardware will not perform the subsequent write.

SUMMARY

In various embodiments, the present disclosure provides multi-processor systems in which at least one processor or processor core is configured to receive an instruction directing the at least one processor core to read a value associated with a memory address. In response to receiving the instruction and before execution of the instruction, the at least one processor or processor core causes ones of the plurality of mutually communicatively inter-coupled processor cores to provide a plurality of locally stored values that are stored individually in the respective processor cores and that are associated with the memory address.

In some embodiments, the multi-core processor system includes a processor fabric that interconnects the processor cores. The at least one processor core is configured to cause the ones of the plurality of processor cores to provide the locally stored values associated with the memory address by at least issuing a read command for the memory address to the processor fabric. The processor fabric is configured, in response to receipt of the read command, to request the locally stored values associated with the memory address from the plurality of processor cores, determine the value associated with the memory address based at least on the locally stored values provided by the plurality of processor cores, and to provide the value to the at least one processor core. In some embodiments, the processor fabric is further configured to process the locally stored values to determine the value. In some embodiments, the at least one processor core is further configured to provide a copy of its own locally stored value associated with the memory address responsive to the request by the processor fabric.

In some embodiments, the at least one processor core is further configured to determine that the memory address is one of a set of pre-determined memory addresses, and to cause the plurality of processor cores to provide the locally stored values in response to a determination that the memory address is one of the set. In some embodiments, the at least one processor core is further configured to, responsive to receipt of another instruction to write to the memory address, update its own locally stored value associated with the memory address responsive to at least another determination that the memory address is one of the set.

In some embodiments, the at least one processor core is configured to cause the ones of the plurality of mutually communicatively inter-coupled processor cores to provide counter values that are associated with the memory address and locally stored in the respective ones of the processor cores.

In some embodiments, the at least one processor core is further configured to cause the plurality of processor cores to provide the locally stored values associated with the memory address by at least issuing a read command for the memory address on a processor bus. The at least one processor core is further configured to receive a value associated the memory address via the bus, the value based on the locally stored values provided by the plurality of processor cores.

In some embodiments, the at least one processor core is further configured to, responsive to receipt of another instruction to write to the memory address, update its own locally stored value associated with the memory address.

In various embodiments, the present disclosure provides a method for maintaining synchronization of a value associated with a shared memory address in a multi-core processor system. The method includes receiving, by one of a plurality of mutually interconnected processor cores of the multi-core processor system, a computer instruction to read the value associated with the shared memory address. Responsive to receipt of the computer instruction and before execution of the computer instruction, the at least one processor core causes the other ones of the plurality of processor cores of the multi-core processor system to provide locally stored values that are associated with the shared memory address and that are stored locally on individual other ones of the plurality of processor cores.

In some embodiments, the one of the plurality of processor cores issues a read command for the value associated with the shared memory address. A processor interconnect issues, responsive to receipt of the read command, requests to the plurality of processor cores of the multi-core processor system for the locally stored values associated with the shared memory address. In some embodiments, the issuing the requests includes issuing a request to the one of the plurality of processor cores. In some embodiments, the method further comprises determining, by the processor interconnect, that the shared memory address is one of a set of pre-determined memory addresses, and wherein the issuing the requests to the plurality of processor cores is in response to a determination that the shared memory address is one of the set.

In some embodiments, the method includes receiving, by a processor interconnect, the locally stored values from the plurality of processor cores. Either the processor interconnect, or the one of the plurality of processor cores, determines the value associated with the shared memory address based at least on the locally stored values. In some embodiments, the determining includes processing the locally stored values to determine the value associated with the shared memory address.

In some embodiments, the method includes receiving, by the at least one processor cores, the value associated with the shared memory address, the value based at least on a combination of the locally stored values.

In some embodiments, the method includes determining, by the one of the processor cores, that the shared memory address is one of a set of pre-determined memory addresses. The plurality of processor cores are caused to provide the locally stored values in response to a determination that the shared memory address is one of the set.

In some embodiments, the causing includes issuing a read instruction for the shared memory address to a processor interconnect that interconnects the plurality of processors, and the method further comprises receiving from the processor interconnect the value associated with the shared memory address.

In some embodiments, the method includes updating, by the one of the plurality of processors, its own locally stored value associated with the shared memory address responsive to at least receiving another computer instruction to write to the memory address, and responsive to a determination that the shared memory address is one of a set of pre-determined memory addresses.

In various embodiments, the present disclosure provides a multi-core processor system comprising a plurality of mutually communicatively inter-coupled processor cores. At least one processor core of the plurality of processor cores is configured to receive a first instruction directing the at least one processor core to read a first value associated with a first memory address and to receive a second instruction directing the at least one processor core to read a second value associated with a second memory address. In response to determining that the first memory address is in a predetermined set of memory addresses, and before execution of the first instruction, the at least one processor core causes ones of the plurality of mutually communicatively inter-coupled processor cores to provide a plurality of locally stored values that are stored individually in the respective processor cores and that are associated with the first memory address. In response to determining that the second memory address is not in the predetermined set of memory addresses, and before execution of the second instruction, the at least one processor core issues a read command to a shared memory for the second value associated with the second memory address. In some embodiments, the multi-core processor system includes a processor fabric that interconnects the processor cores. The at least one processor core is configured to cause the ones of the plurality of processor cores to provide the locally stored values associated with the first memory address by at least issuing another read command for the first memory address to the processor fabric. The processor fabric is configured, in response to receipt of the other read command, to request the locally stored values associated with the first memory address from the plurality of processor cores, determine the first value associated with the first memory address based at least on the locally stored values provided by the plurality of processor cores, and to provide the first value to the at least one processor core.

In some embodiments, the processor fabric is further configured to, in response to receiving the other read command for the first memory address, read from the shared memory a temporary value associated with the first memory address, and to determine the first value associated with the first memory address based at least on the locally stored values provided by the plurality of processor cores as well as the temporary value.

In some embodiments, the at least one processor core is configured to, responsive to receipt of another instruction to write to the first memory address, and responsive to at least another determination that the first memory address is one of the predetermined set of memory addresses, update its own locally stored value associated with the first memory address.

In some embodiments, the at least one processor core is configured to cause the plurality of processor cores to provide the locally stored values associated with the first memory address by at least issuing a first read command for the memory address on a processor bus. The at least one processor core receives the first value associated the memory address via the bus, the first value based on one or more of the locally stored values provided by the plurality of processor cores and a temporary value stored in the shared memory.

In some embodiments, the multi-core processor system includes a processor fabric that interconnects the processor cores and that is configured to protect the shared memory with a semaphore system. In some embodiments, the at least one processor core is configured to cause the ones of the plurality of mutually communicatively inter-coupled processor cores to provide counter values that are associated with the first memory address and that are locally stored in the respective ones of the processor cores.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION

Figure 1:
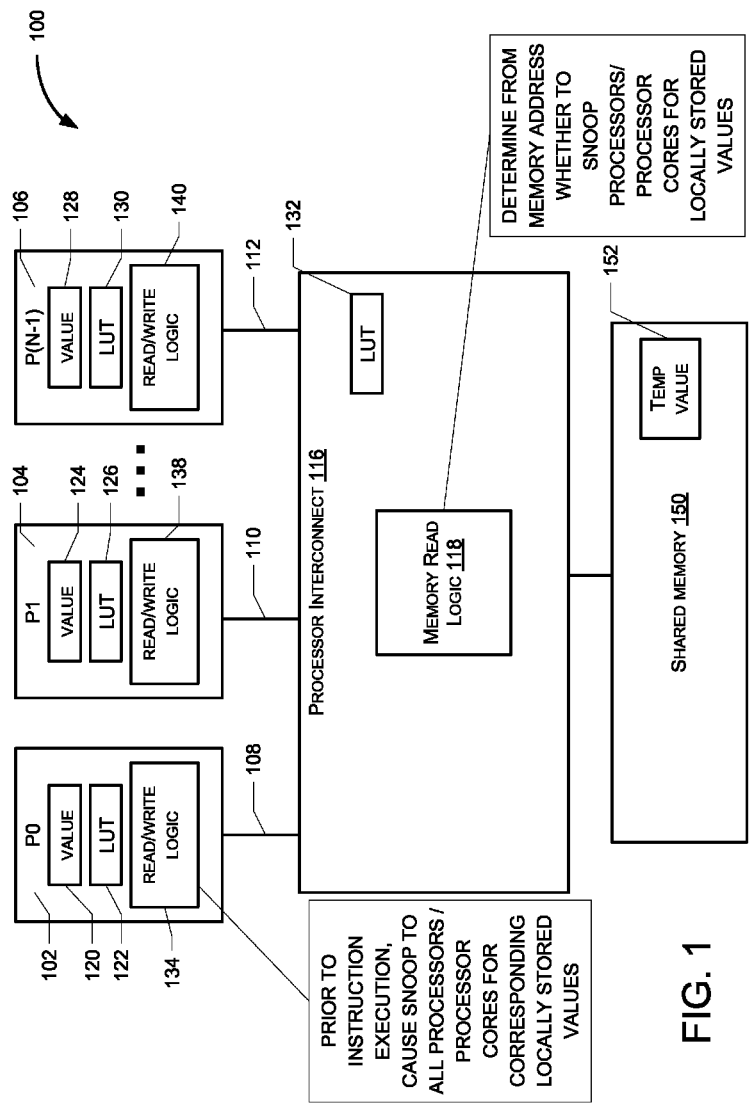
FIG. 1 schematically illustrates an example multi-core processor system configured to synchronize a shared op-symmetric update-sensitive (SOSUS) variable.

The present specification describes a method for synchronizing a variable in multi-processor systems, including multi-core processor systems. Computer instructions, such as software instructions, to update certain variables (identified by a look-up table) result in writes performed by a processor locally—that is, writes are performed to a local, non-cached copy of the variable stored on the processor. Additionally, software reads to the variables are performed by a processor globally, which result in snoops being issued to the processor cores for their locally stored values. More specifically, a requesting processor responds to a software instruction to read the variable by issuing a read command to a shared memory address for the variable. A processor interconnect, or a processor fabric, receives the read command and determines that a particular read request is for a memory address designated to be read in a manner described herein. Instead of passing the read command to a shared memory, logic in the processor interconnect issues snoop commands to the processor cores, including the requesting processor core, for their locally stored values of the variable. The processor interconnect receives the locally stored values from the processors and determines a global value for the variable based on the locally stored values. In some embodiments, the processor interconnect also performs a read to the shared memory for a temporary (or baseline) global value, and determines the global value from the locally stored values and the baseline/temporary value stored in the shared memory. For example, in some embodiments, the processor interconnect sums the locally stored values and the temporary value from shared memory to determine the global value for the variable. In other embodiments, other processing is used to determine the global value for the variable, such as bit-wise OR operation. The processor interconnect then provides the global value to the requesting processor core, which then uses the global value to execute a software instruction.

A certain type of variable, herein referred to as a shared op-symmetric update-sensitive (SOSUS) variable, is a type of variable that is amenable to treatment in the manner described herein. A SOSUS variable is shared by a plurality of processors, in an embodiment. An op-symmetric type variable is one that is updated by an operation that is both associative and symmetric. For example, a counter is op-symmetric because $(cnt+A)+B=(cnt+B)+A$. In another example, a bit-wise OR is an op-symmetric operation, since $v|B|C=v|(C|B)$. Update-sensitive refers to the fact that systems are often sensitive to the update latency of such variables, but not sensitive to the observational latency of such variables. By updating locally, update latency is greatly reduced compared to updating a global value of the variable stored in shared memory. Although reading a variable using the processes described herein results in read latencies that are potentially higher compared to simply reading from a shared memory (though not necessarily), systems are not especially sensitive to read latency for these types of variables, and there is little or no resulting impact on performance if read latency is increased. This combination of factors makes SOSUS variables amenable to local updates and global reads as described herein.

FIG. 1 schematically illustrates an example multi-core processor system 100 configured to synchronize a SOSUS variable. The system 100 includes a plurality of N processors 102, 104, and 106 (also labeled P0 through P(N−1) in FIG. 1). In some embodiments, the processors 102-106 are processor cores, or multiple single-processor cores, configured to execute software instructions. In some embodiments, the processors 102-106 are application-specific integrated circuits (ASIC), field-programmable gate arrays (FPGA), or other hardware processor type. The system 100 includes a processor interconnect 116 and a shared memory 150. The processor interconnect communicatively interconnects the processors 102-106. The shared memory 150, which suitably includes, or is included in, various types of memory (such as dynamic random access memory (DRAM), static random access memory (SRAM), flash memory, and so forth), are shared by all processors 102-106. The shared memory 150 includes globally addressable memory locations that are accessible (e.g., able to be read from and/or written to) by plural ones of processors 102-106. The processor interconnect 116, when performing writes to a shared memory location within the shared memory 150 employs a semaphore-based flag system, or other mechanism, to lock access to the shared memory location to other processes while the memory location is being updated. Also, as described in more detail below, some shared memory addresses are associated with locally stored values stored on the processors 102-106. The processor interconnect 116 snoops the processors 102-106 for their locally stored values, rather than or in addition to reading the memory address from the shared memory 150.

The processors 102, 104, and 106 store locally stored values 120, 124, and 128, respectively. In some embodiments, the locally stored values 120, 124, and 128 are counter values stored in a hardware counter of the processors 102-106. The processors 102-106 are configured—either statically or through suitable computer instructions—to associate the locally stored values 120, 124, and 128 with a particular shared memory address. Each of the locally stored values 120, 124, and 128 are associated with the same shared memory address.

The look-up tables ("LUT") 122, 126, and 130 stored on processor 102-106 identify one or more shared memory addresses for which software instructions are to be handled according to the processes described herein (e.g., to update locally and read globally). The LUTs 122, 126, and 130 also identify the locally stored variables associated with those shared memory addresses that are to be handled according to the processes described herein. For example, the LUTs 122, 126, and 130 identify SOSUS variables and/or other types of variables. In the same or different embodiments, the LUTs 122, 124, and 126 also or alternatively identify shared memory addresses for which software instructions are treated in other ways, such as for example by conventional read and writes to shared memory. In the example embodiments illustrated in FIG. 1, LUT 122 identifies value 120 as being associated with a particular shared memory address; LUT 126 identifies value 124 as being associated with the same particular shared memory address; and LUT 130 identifies value 128 as being associated with the same particular shared memory address.

A read/write logic 134 in the processor 102 performs various functions related to reading and writing to shared memory addresses. The logic 134 identifies a treatment for a shared memory address based at least on a look-up to the LUT 122. For example, the processor 102 receives or schedules a software instruction to update, increment, or write to, a value stored at a first shared memory address. The logic 134 determines, e.g. from the LUT 122, that updates to the first shared memory address are to be performed locally. Upon determining that reads to the first shared memory address are to be performed locally, the logic 134 updates, or otherwise causes the processor 102 to update, the value 120 stored locally on the processor 102. In another example, the processor 102 receives or schedules a software instruction to write, or update, a value stored at a second memory address. The logic 134 determines from the LUT 122 that updates to the second shared memory address are to be performed globally. Upon determining that reads to the second shared memory address are to be performed globally, the logic 134 issues, or otherwise causes the processor 102 to issue, a read command via a processor bus 108 to the processor interconnect 116 to store the value at the second shared memory address within the shared memory 150.

Upon receiving a computer instruction, or scheduling a computer instruction, to read a value associated with the first memory address, the logic 134 issues, or otherwise causes the processor 102 to issue, a read command to the processor interconnect 116 via the processor bus 108. Likewise, upon receiving a software instruction, or scheduling a software instruction, to read a value associated with the second memory address, the logic 134 issues, or otherwise causes the processor 102 to issue, a read command to the processor interconnect 116 via the processor bus 108.

Processor 104 includes a read/write logic 138 that functions in the same or in a similar way as read/write logic 134. And processor 106 includes a read/write logic 140 that functions in the same or in a similar way as read/write logic 134.

The processor interconnect 116 is communicatively coupled to the processors 102-106 via processor busses 108, 110, and 112. The processor interconnect 116 facilitates the processors 102-106 being mutually communicatively intercoupled to one another, as well as coupling the processors 102-106 to the shared memory 150, in an embodiment. Upon the processor interconnect 116 receiving a read command from one of the processors 102-106, a memory read logic 118 of the processor interconnect 116 determines a treatment for the read command from a LUT 132.

Receipt of a command from a requesting processor (e.g., one of the processors 102-106) to read the value associated with a first shared memory address (i.e., the memory address associated with the values 120, 124, and 128 as determined by the look-up to the LUT 132) results in the memory read logic 118 requesting from each of the processors 102-106 (including the requesting processor) the locally stored values 120, 124, and 128 associated with the first shared memory address. For example, the memory read logic 118 issues snoop commands specifying the first shared memory address to the processors 102-106, which results in the processors 102-106 providing the locally stored values 120, 124, and 128.

Upon receiving the locally stored values 120, 124, and 128 the memory read logic 118 determines a global value associated with the first shared memory address from the locally stored values 120, 124, and 128, and provides the global value to the requesting processor. In some embodiments, in addition to requesting the locally stored values from the processors 102-106, the processor interconnect 116 also reads a temporary value (e.g., temp value 152) from the shared memory 150, and determines the global value from the locally stored values 120, 124, and 128 as well as from the temp value 152. In some embodiments, the processors 102-106 flush the locally stored value to the shared memory in order to make room on the processors 102-106 for other values, such as other counter values. Flushing the locally stored values includes, in some embodiments, clearing the locally stored value (such as a local counter value), and causing it to be written to the shared memory, such as to temp value 152, which is also addressable via the shared memory address associated with the locally stored values 120, 124, and 128. In some embodiments, flushing the locally stored values 120, 124, and 128 to the shared memory 150 includes determining a global value for the variable (including snooping the processors 102-106 for their corresponding locally stored values 120, 1234, and 128 and reading the temp value 152 from the shared memory 150), storing the global value to the shared memory 150 as a read-modify-write to the temp value 152 memory location, and clearing the locally stored values in the processors 102-106.

The processors 102-106, in some embodiments, flush their values 120, 124, or 128 to the shared memory 150 before going into a low-power mode, such as a power-down mode, a power-save mode, or other mode. The flush operation includes a read-modify-write of the temp value 152. In some embodiments, the locally stored values 120, 124, or 128 are flushed to the shared memory 150 without snooping the other caches, and without determining a global value for the shared variable. The write to the temp value 152 in the shared memory 150 is atomic or semaphore protected. In some embodiments, different temp values are stored for each of the processors 102-106. In some embodiments, the processor interconnect 116 keeps track of those processors that are in a low-power mode or otherwise have their locally stored values stored temporarily in the shared memory 150, and selectively reads the temporary values from the shared memory 150 based on whether the processor has its counter value temporarily stored in the shared memory 150.

In some embodiments, the memory read logic 118 sums the locally stored values 120, 124, and 128 (and in some embodiments the temp value 152) to determine the global value. In other embodiments, the memory read logic performs some other associative and symmetric operation, such as a bit-wise OR operation. The operation performed on the local values 120, 124, and 128 (and in some embodiments the temp value 152) to determine the global value may, in some embodiments, be determined by a look-up to the LUT 132, and may be software-configurable or hard-coded. As noted above, values for shared variables associated with certain shared memory addresses are not stored in the shared memory 150; instead, the values are determined by the logic 118 in response to receiving a command to read the shared memory address associated with the shared variable. In some sense, therefore, the global values for certain shared variables (associated with certain shared memory addresses) are virtually stored by the processor interconnect 116 and the processors 102-106.

In a particular embodiment, the values 120, 124, and 128 are counter values, associated with a single shared memory address. The processors 102-106 are configured to update the counter values 120, 124, and 128 locally and to read the counter globally. In particular, the processors 102-106 respond to a store operation to a shared memory address associated with the counter values 120, 124, and 128 by incrementing the locally stored counters. A read instruction to the shared memory address associated with the counter values 120, 124, and 128 results in snoop operations being issued to each of the processors 102-106; e.g., the requesting processor issues a read command to the processor interconnect 116 for the associated shared memory address, which then issues snoop commands to the processors 102-106 (including the requesting processor). The processors 102-106 respond to the snoop operations by providing their locally stored values 120, 124, and 128 to the processor interconnect 116. The processor interconnect 116 uses the values 120, 124, and 128 to determine the global value for the shared memory address associated with the counter, and then provides it to the requesting processor.

Next, a particular example of an implementation of the system 100 is described. The following transactions are transferred over the busses 108-112 between the processors 102-106 and the processor interconnect 116 (pBUS refers to a processor bus coupling a processor to the processor interconnect 116):

1. pBUS.READ(B): a read request from processor to interconnect that is responded to with the value associated with memory address B.
2. pBUS.SNOOP(B): a snoop request from interconnect to processor that is responded to with the value associated with the locally stored value associated with the memory address B.

Within the LUTs 122, 126, and 130 (as well as LUT 132) is SOSUS(B) denotes that a memory address B is to be handled with local updates and global reads. Counters associated with values 120, 124, and 128 respond to the following commands (pCNT refers to a private counter of the processor):

1. pCNT.pCNT causes the private counter to return its value, denoted as pCNT.val.
2. pCNT.INC(D) causes the counter to increment by a value of D.

Software instructions that the processors 102-106 are configured to respond to include:

1. STR(B,D) causes the processor to increment the counter associated with shared memory address B by a value of D.
2. LDR(B) causes the processor to read the value stored at the counter associated with shared memory address B.

The read/write logic 134, 138, and 140 of the processors 102-106 are configured to perform the following operations:

If there is an instruction STR(B,D) and is SOSUS(B) THEN pCNT.INC(D); i.e., receipt of the software instruction STR(B,D) causes the read/write logic 134, 138, and 140 to determine whether the memory address B is a SOSUS variable (or more generally, whether it is to be locally updated and globally read), and if so it issues a command to the counter to increment itself by the value D.

If there is an instruction LDR(B) and is SOSUS(B) THEN pBUS.READ(B); i.e., receipt of the software instruction LDR(B) causes the read/write logic 134, 138, and 140 to determine whether the memory address B is a SOSUS variable (or more generally, whether it is to be updated locally and read globally), and if so issues a command to the bus for the value associated with the memory address B.

If there is an incoming snoop pBUS.SNOOP(B) and is SOSUS(B) THEN pBUS.SNOOP_RESP.DATA=pCNT.val; i.e., in receipt of a snoop operation via a processor bus for a value associated with memory address B, the processor determines that a variable associated with memory address B is to be treated as a SOSUS variable, and responds to the snoop operation with the value of the local counter pCNT.

The memory read logic 118 of the processor interconnect 116 is configured to perform the following algorithm:

If pBUS.READ(B) and is SOSUS(B) THEN:
1. Send to all processors a snoop command with address B (pBUS.SNOOP(B)).
2. Read the temp value 152 from the shared memory 150.
3. Receive from all processors SNOOP_RESP values Di (Di=value from processor i)
4. Respond to the requesting processor with a sum of all Di+temp value 152.

Thus, receipt of a read command by the processor interconnect 116 from a processor for memory address B, where B is indicated to be treated as a SOSUS variable, results in the processor interconnect issuing snoop commands to all processors (including the requesting processor), receiving local values for the counter, reading the temp value 152 (using for example a semaphore protection, and summing all the local values plus the temp value 152 to obtain a global value for the counter, which the processor interconnect then provides to the requesting processor. The global value is also, in some embodiments, written back to the temp value 152 of the shared memory 150, and the local counter values flushed.

Figure 2:
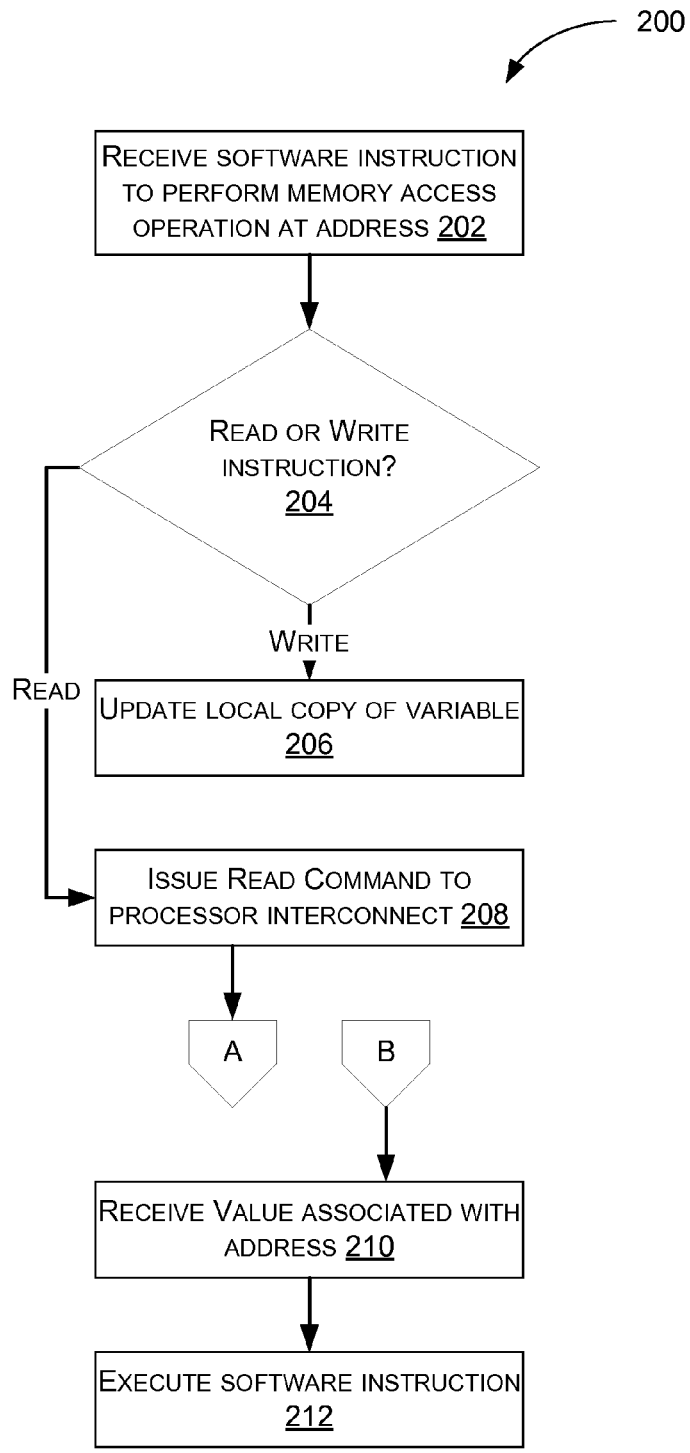
FIG. 2 is a flow diagram of a method of a processor responding to a memory access instruction for a shared memory address, in accordance with various embodiments.

FIG. 2 is a flow diagram of a method 200 of a processor responding to a memory access instruction for a shared memory address, in accordance with various embodiments. At 202, a processor of a multi-core or multi-processor system, such as one of the processors 102-106, receives an instruction to perform a memory access operation associated with a shared memory address, where the shared memory address is to be updated locally and read globally, as described in more detail elsewhere within this Detailed Description. The shared memory address is associated with a locally stored value (e.g., values 120, 124, and 128), such as in a counter, within the processor.

Figure 3:
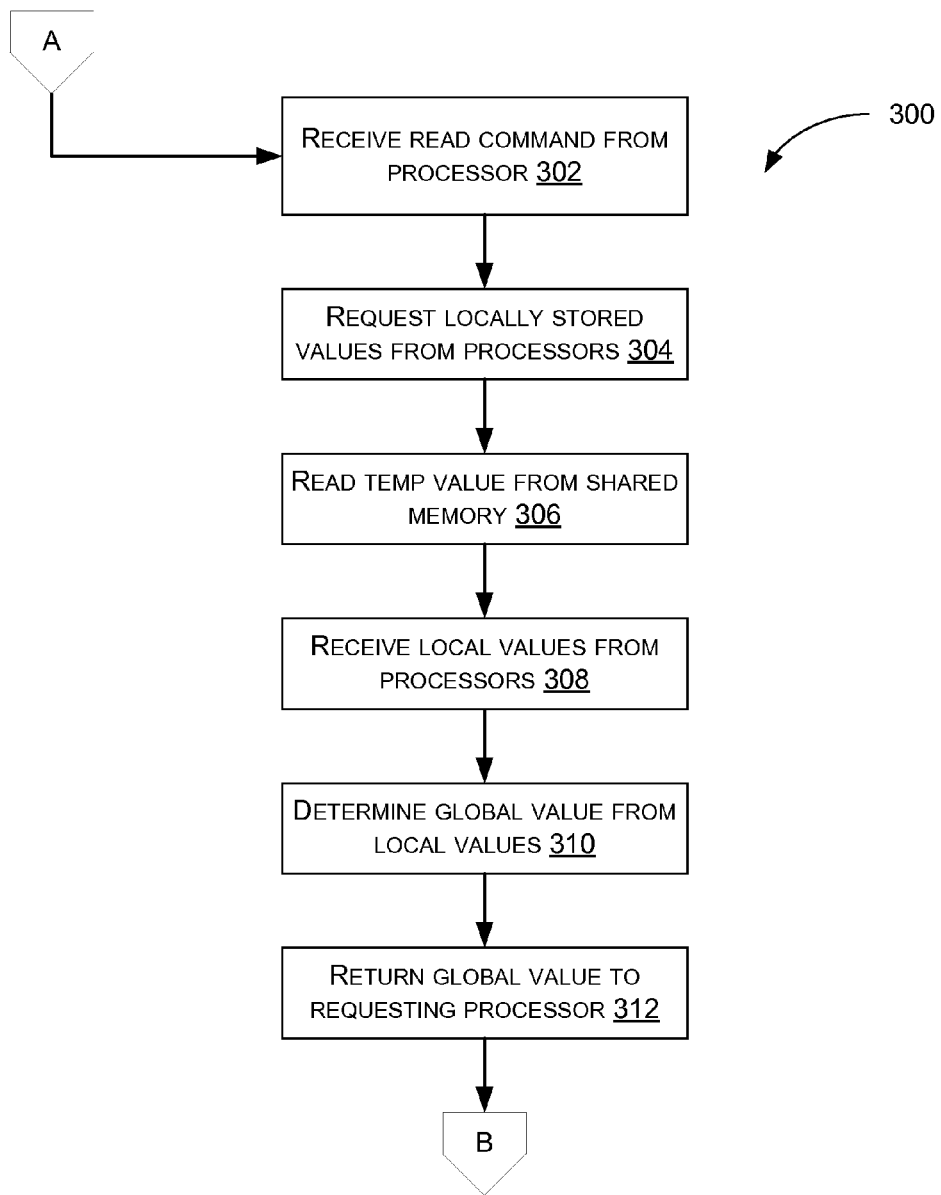
FIG. 3 is a flow diagram of a method of a processor interconnect responding to a command to read a shared memory address, in accordance with various embodiments.

At 204, the processor determines whether the memory access operation is a read operation or a write operation. Upon determining that the memory operation is a write operation (such as is associated with a software command to increment a counter), at 206, the processor updates the locally stored copy of the value. Upon determining that the memory operation is a read a command, at 208, the processor issues a read command to a processor interconnect, such as the processor interconnect 116. Refer to FIG. 3 for subsequent operations performed by the processor interconnect as indicated by off-page reference A.

At 210, the processor receives from the processor interconnect a global value associated with the shared memory address (off-page reference B refers to FIG. 3). At 212, the processor uses the global value to execute the received software command. For example, the processor may store the global value to a register or to another memory location for use in subsequent software instructions.

FIG. 3 is a flow diagram of a method 300 of a processor interconnect responding to a command to read a shared memory address, in accordance with various embodiments. At 302, a processor interconnect, such as the processor interconnect 116, receives from a requesting processor (e.g., one of processors 102-106) a command to read a value associated with a shared memory address (off-page reference A refers to FIG. 2).

At 304, the processor interconnect requests the locally stored values associated with the shared memory address from the plurality of processors, including the requesting processor. Requesting the locally stored values includes, in some embodiments, issuing snoop commands to the plurality of processors for locally stored values associated with the shared memory address.

At 306, the processor interconnect reads a temp value, such as the temp value 152, from the shared memory, such as the shared memory 150.

At 308, locally stored values associated with the shared memory address are received from the processors by the processor interconnect. The locally stored values are returned via the processor busses.

At 310, the processor interconnect determines, from the received locally stored values, and in some embodiments also from the temp value stored in the shared memory, a global value associated with the shared memory address. Determining the global value includes performing some operation associated with the shared memory address, such as a sum of the locally stored values (as in a counter), a bit-wise OR operation, or other associative and symmetric operation.

At 312, the processor interconnect returns the global value to the requesting processor, such as via the processor bus. Refer back to FIG. 2 for the remainder of the process flow. The processor interconnect also, in some embodiments, writes the determined global value to the shared memory 150, such as using a read-modify-write to the memory location for the temp value stored therein. The processors also, in these embodiments, flush or reset their local counter values.

Figure 4:
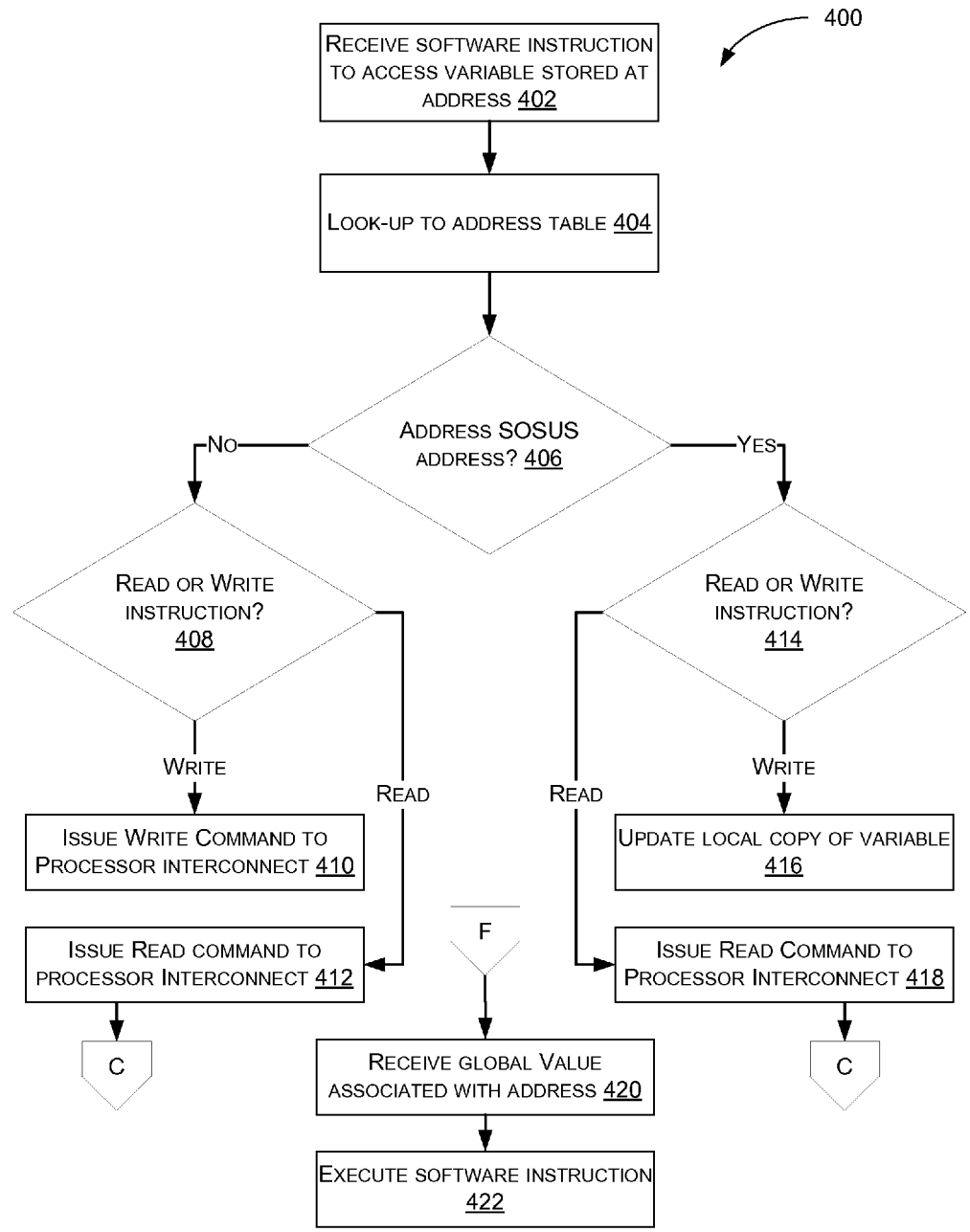
FIG. 4 is a flow diagram of a method in which a processor determines a process for responding to a memory access instruction for a shared memory address, in accordance with various embodiments.

FIG. 4 is a flow diagram of a method 400 in which a processor determines a process for responding to a memory access instruction for a shared memory address, in accordance with various embodiments. At 402, a processor of a multi-core or multi-processor system, such as one of the processors 102-106, receives a software instruction to perform a memory access operation associated with a shared memory address.

At 404, the processor performs a look-up to a look-up table, such as one of the look-up tables 122, 126, or 130, to determine whether the variable is to be updated locally and read globally (in other words is it to be treated as a SOSUS variable).

Upon determining, at 406, that the shared memory address is not to be treated as a SOSUS variable ("no" path), the processor determines, at 408, whether the memory access operation is a read instruction or a write instruction. Upon determining that the instruction is a write instruction, at 410 the processor issues a write command for the shared memory address to a processor interconnect, such as the processor interconnect 116. Upon determining that the instruction is a read instruction, at 412 the processor issues a read command for the shared memory address to the processor interconnect.

Figure 5A:
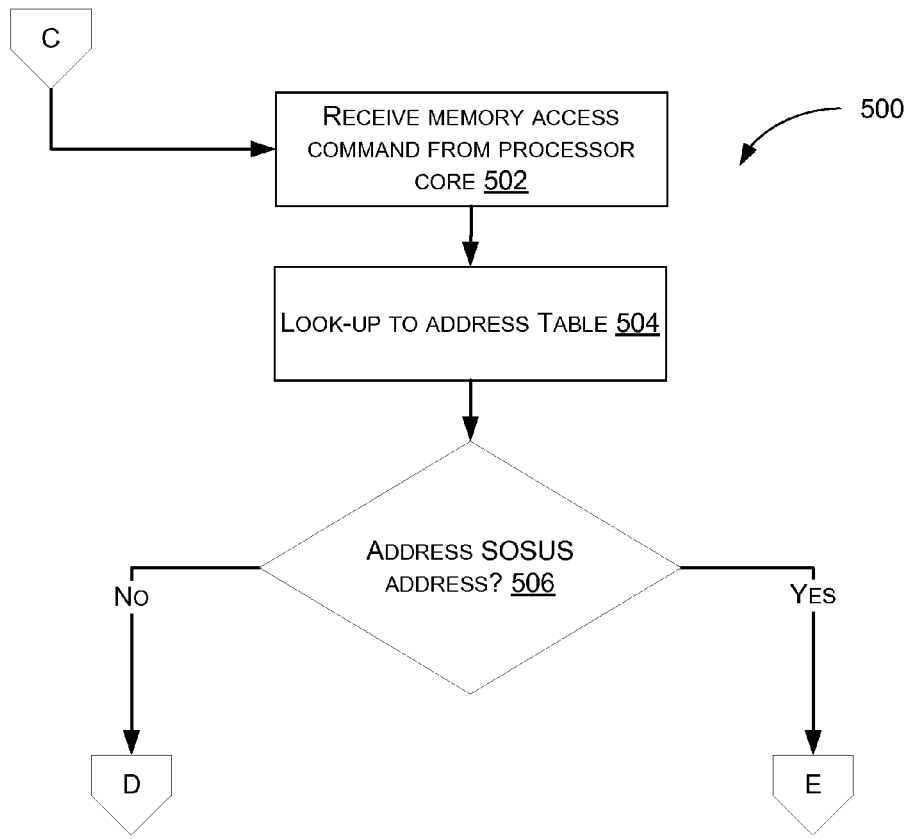
FIGS. 5A-5C are flow diagrams of a method in which a processor interconnect determines a process for responding to a memory access instruction for a shared memory address, in accordance with various embodiments.
Figure 5B:
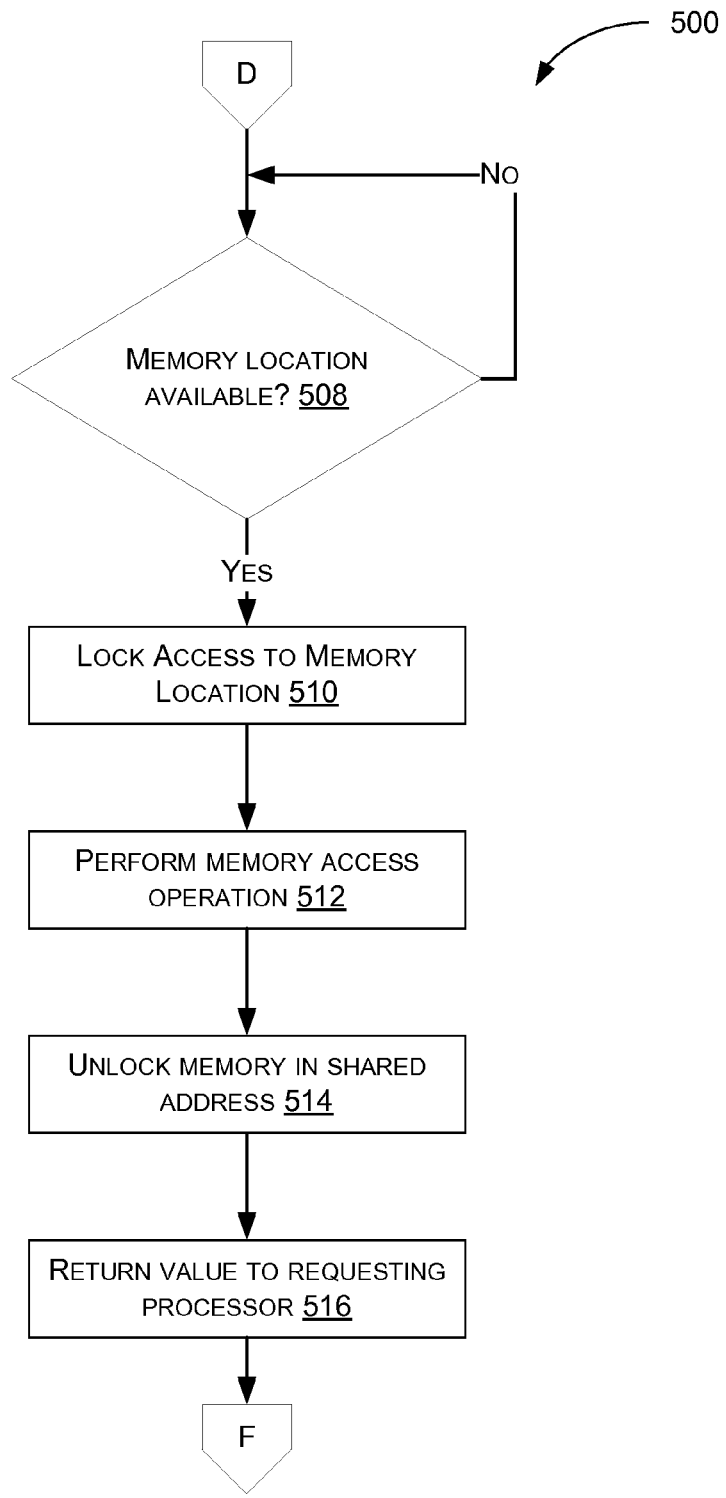
Figure 5C:
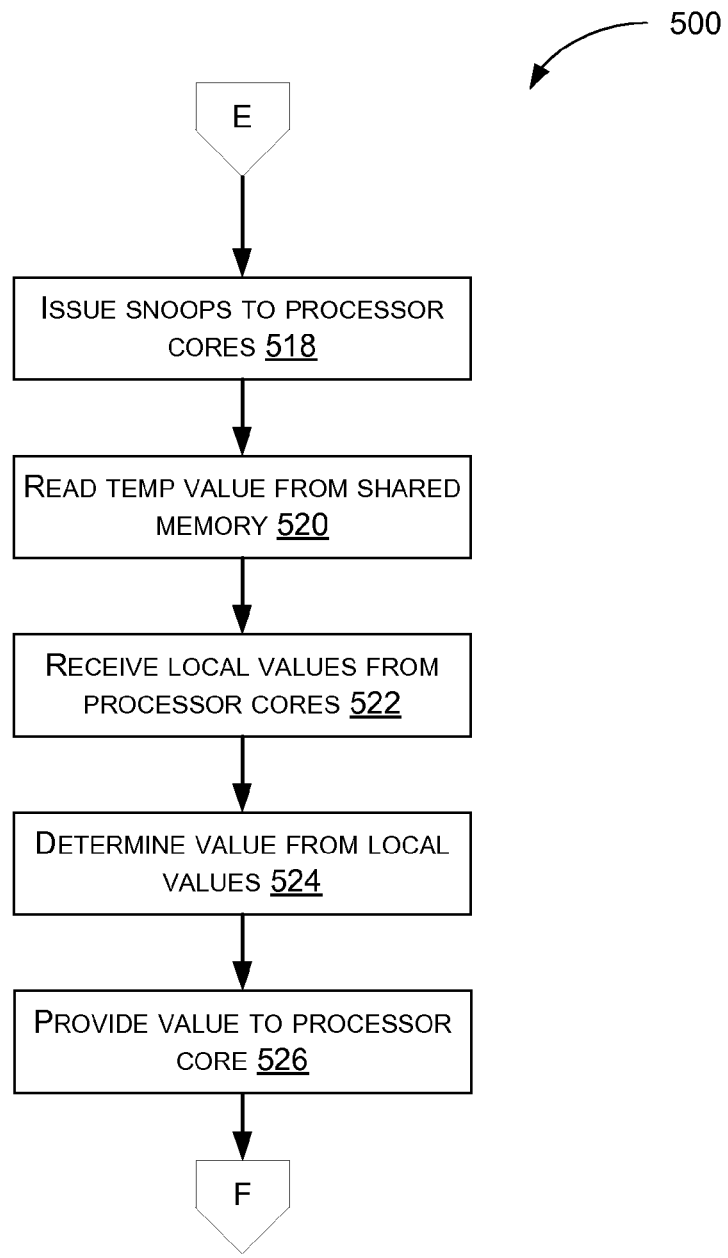

Upon determining, at 406, that the shared memory address is associated with a SOSUS variable ("yes" path), the processor determines, at 414, whether the memory access operation is a read instruction or a write instruction. Upon determining that the memory operation is a write operation (such as is associated with a software instruction to increment a counter), at 416, the processor updates the locally stored copy of the value. Upon determining that the memory operation is a read command, at 418, the processor issues a read command to the processor interconnect. Refer to FIGS. 5A-C for subsequent operations performed by the processor interconnect, as indicated by off-page reference C.

At 420, the processor receives from the processor interconnect (off-page reference F refers to FIGS. 5B and 5C), in response to the read command, a global value associated with the shared memory address. At 422, the processor uses the global value to execute the received software command. For example, the processor may store the global value to a register or to another memory location for use in subsequent software instructions.

FIGS. 5A-5C include flow diagrams of a method 500 in which a processor interconnect determines a process for responding to a memory access instruction for a shared memory address, in accordance with various embodiments. Referring to FIG. 5A, at 502, a processor interconnect, such as the processor interconnect 116, receives from a requesting processor (e.g., one of processors 102-106) a memory access command for a shared memory address (off-page reference C refers to FIG. 4).

At 504, the processor interconnect performs a look-up to a look-up table, such as the LUT 132) to determine whether the variable is to be treated as a SOSUS variable.

Upon determining at 506 that the variable is not to be treated as a SOSUS variable ("no" path), the processor interconnect (or alternatively the shared memory) at 508 (shown in FIG. 5B, denoted by off-page reference D) determines whether the memory location in the shared memory (e.g., shared memory 150) associated with the memory address is available, or currently locked by another process. Determining the availability of the memory location includes, in some embodiments, reference to a semaphore-type flag to determine the availability of the memory location. The processor interconnect or the shared memory waits for the memory location to become available before proceeding.

Upon determining at 508 that the shared memory location is available ("yes" path), at 510 the processor interconnect or the shared memory locks the memory location to prevent other processes from accessing the shared memory location. At 512, the memory access operation is performed according to the memory access command. The memory access command may include, in various embodiments, a read command, a write command, a read-modify-write command, or other.

At 514, the memory location is unlocked. This includes setting a semaphore-type flag to indicate the availability of the shared memory location, thereby freeing access to it by other processes.

Where the memory access operation is a read, at 516, the processor interconnect provides the value read from the shared memory to the requesting processor.

Referring back to FIG. 5A, upon determining at 506 that the variable is to be treated as a SOSUS variable ("yes" path), the processor interconnect at 518 (shown in FIG. 5C, denoted by off-page reference E), the processor interconnect requests the locally stored values associated with the shared memory address from the plurality of processors, including the requesting processor. Requesting the locally stored values includes, in some embodiments, issuing snoop commands to the plurality of processors for locally stored values associated with the shared memory address.

At 520, the processor interconnect reads a temp value, such as the temp value 152, from the shared memory, such as the shared memory 150.

At 522, local values associated with the shared memory address are received from the processors by the processor interconnect. The locally stored values are returned via the processor busses.

At 524, the processor interconnect determines, from the received local values and in some embodiments also from the temp value stored in the shared memory, a global value associated with the shared memory address. Determining the global value includes performing some operation associated with the shared memory address, such as a sum of the locally stored values and the temp value (as where the shared variable is a counter), a bit-wise OR operation, or other associative and symmetric operation.

At 524, the processor interconnect returns the global value to the requesting processor, such as via the processor bus. The processor interconnect also, in some embodiments, writes the determined global value to the shared memory, such as using a read-modify-write to the memory location for the temp value already stored therein, using a semaphore or atomic protected read-modify-write operation. The processors also, in these embodiments, flush or reset their local counter values.

Although certain embodiments have been illustrated and described herein, a wide variety of alternate and/or equivalent embodiments or implementations calculated to achieve the same purposes may be substituted for the embodiments illustrated and described without departing from the scope of the present invention. For example, certain functions performed by the processor interconnect 116, as described herein, may in alternative embodiments be performed by one or of the processors 102-106 (e.g., the processors may be configured to issue snoop commands directly, receive the locally stored values, and determine a global value to be used to execute software instructions), the shared memory, or other device not otherwise described herein (e.g., a memory controller). This application is intended to cover any adaptations or variations of the embodiments discussed herein. Therefore, it is manifestly intended that embodiments in accordance with the present invention be limited only by the claims and the equivalents thereof.

What is claimed is:

1. A multi-core processor system comprising:
a plurality of mutually communicatively inter-coupled processor cores, at least one processor core of the plurality of mutually communicatively inter-coupled processor cores being configured to:
receive an instruction directing the at least one processor core to read a variable associated with a memory address; and
in response to receiving the instruction and before execution of the instruction, cause ones of the plurality of mutually communicatively inter-coupled processor cores to provide a plurality of locally stored values of the variable, the plurality of locally stored values usable to determine a global value of the variable, the locally stored values being stored individually in the ones of the plurality of mutually communicatively inter-coupled processor cores and being associated with the memory address.

2. The multi-core processor system of claim 1, further comprising a processor fabric that interconnects the plurality of mutually communicatively inter-coupled processor cores.

3. The multi-core processor system of claim 2, wherein the at least one processor core is further configured to cause the ones of the plurality of mutually communicatively inter-coupled processor cores to provide the locally stored values associated with the memory address by at least issuing a read command for the memory address to the processor fabric, the processor fabric being configured, in response to receipt of the read command, to:
issue a request for the locally stored values of the variable associated with the memory address from the plurality of mutually communicatively inter-coupled processor cores;
determine the global value of the variable based at least on the locally stored values of the variable provided by the plurality of mutually communicatively inter-coupled processor cores; and
provide the global value of the variable to the at least one processor core.

4. The multi-core processor system of claim 3, wherein the processor fabric is further configured to process the locally stored values of the variable to determine the global value.

5. The multi-core processor system of claim 3, wherein the at least one processor core is further configured to provide a copy of its own locally stored value of the variable associated with the memory address responsive to the request by the processor fabric.

6. The multi-core processor system of claim 1, wherein the at least one processor core is further configured to determine that the memory address is one of a set of pre-determined memory addresses, and to cause the plurality of mutually communicatively inter-coupled processor cores to provide the locally stored values of the variable in response to a determination that the memory address is one of the set.

7. The multi-core processor system of claim 6, wherein the at least one processor core is further configured to, responsive to receipt of another instruction to write to the memory address, update its own locally stored value of the variable associated with the memory address responsive to at least another determination that the memory address is one of the set.

8. The multi-core processor system of claim 1, wherein the locally stored values of the variable are counter values that are associated with the memory address and that are locally stored in the ones of the plurality of mutually communicatively inter-coupled processor cores.

9. The multi-core processor system of claim 1, wherein the at least one processor core is further configured to:
cause the plurality of mutually communicatively inter-coupled processor cores to provide the locally stored values of the variable associated with the memory address by at least issuing a read command for the memory address on a processor bus; and
receive the global value of the variable associated the memory address via the processor bus, the global value of the variable based on the locally stored values of the variable provided by the plurality of mutually communicatively inter-coupled processor cores.

10. The multi-core processor system of claim 1, wherein the at least one processor core is further configured to, responsive to receipt of another instruction to write to the memory address, update its own locally stored value of the variable associated with the memory address.

11. A method for maintaining synchronization of a global value of a variable associated with a shared memory address in a multi-core processor system, the method comprising:
receiving, by one processor core of a plurality of mutually interconnected processor cores of the multi-core processor system, a computer instruction to read the variable associated with the shared memory address; and
causing, responsive to receipt of the computer instruction and before execution of the computer instruction, other ones of the plurality of mutually interconnected processor cores of the multi-core processor system to provide a plurality of locally stored values of the variable that is associated with the shared memory address, the plurality of the locally stored values usable to determine the global value of the variable, the locally stored values being individually stored on the other ones of the plurality of mutually interconnected processor cores.

12. The method of claim 11, wherein the causing includes:
issuing, by the one processor core of the plurality of mutually interconnected processor cores, a read command for the global value of the variable associated with the shared memory address; and
issuing by a processor interconnect, responsive to receipt of the read command, requests to the plurality of mutually interconnected processor cores of the multi-core processor system for individual ones of the plurality of locally stored values of the variable associated with the shared memory address.

13. The method of claim 12, wherein the issuing the requests includes issuing a request to the one processor core of the plurality of mutually interconnected processor cores.

14. The method of claim 12, further comprising determining, by the processor interconnect, that the shared memory address is one of a set of pre-determined memory addresses, and wherein the issuing the requests to the plurality of mutually interconnected processor cores is in response to a determination that the shared memory address is one of the set.

15. The method of claim 11, further comprising:
receiving, by a processor interconnect, the locally stored values of the variable from the plurality of mutually interconnected processor cores; and
determining, by one of the processor interconnect or the one processor core of the plurality of mutually interconnected processor cores, the global value of the variable associated with the shared memory address based at least on the locally stored values of the variable.

16. The method of claim 15, wherein the determining includes processing the locally stored values of the variable to determine the global value of the variable associated with the shared memory address.

17. The method of claim 11, further comprising receiving, by the one processor core, the global value of the variable associated with the shared memory address, the global value of the variable based at least on a combination of the locally stored values of the variable.

18. The method of claim 11, further comprising:
   determining, by the one processor core of the plurality of mutually interconnected processor cores, that the shared memory address is one of a set of pre-determined memory addresses; and
   causing the plurality of mutually interconnected processor cores to provide the locally stored values of the variable in response to a determination that the shared memory address is one of the set.

19. The method of claim 11, wherein the causing includes issuing a read instruction for the shared memory address to a processor interconnect that interconnects the plurality of mutually interconnected processor cores, and wherein the method further comprises receiving from the processor interconnect the global value of the variable associated with the shared memory address.

20. The method of claim 11, further comprising updating, by the one processor core of the plurality of mutually interconnected processor cores, its own locally stored value of the variable associated with the shared memory address responsive to at least:
   receiving another computer instruction to write to the shared memory address, and
   a determination that the shared memory address is one of a set of pre-determined memory addresses.

* * * * *